(12) United States Patent
Hammond et al.

(10) Patent No.: US 10,281,336 B2
(45) Date of Patent: May 7, 2019

(54) TEMPERATURE MONITOR

(71) Applicant: Multi Packaging Solutions UK Limited, Nottingham (GB)

(72) Inventors: Carol Hammond, Nottingham (GB); Andrew Degnan, Marlborough (GB)

(73) Assignee: Multi Packaging Solutions UK Limited, Nottingham (GB)

( * ) Notice: Subject to any disclaimer, the term of this patent is extended or adjusted under 35 U.S.C. 154(b) by 535 days.

(21) Appl. No.: 14/575,114

(22) Filed: Dec. 18, 2014

(65) Prior Publication Data
US 2015/0168223 A1    Jun. 18, 2015

(30) Foreign Application Priority Data
Dec. 18, 2013 (GB) .................................. 1322460.5

(51) Int. Cl.
| | | |
|---|---|---|
| G01K 1/02 | (2006.01) | |
| G01K 3/00 | (2006.01) | |
| G09G 3/34 | (2006.01) | |
| G02F 1/167 | (2019.01) | |

(52) U.S. Cl.
CPC ............ *G01K 1/024* (2013.01); *G01K 1/028* (2013.01); *G01K 3/005* (2013.01); *G09G 3/344* (2013.01); *G02F 1/167* (2013.01); *G09G 2380/14* (2013.01)

(58) Field of Classification Search
CPC ........ G01K 1/024; G01K 1/028; G01K 3/005; G02F 1/167; G09G 3/344; G09G 2380/14
USPC .......................................... 702/103; 340/10.4
See application file for complete search history.

(56) References Cited

U.S. PATENT DOCUMENTS

| | | | | |
|---|---|---|---|---|
| 5,388,574 | A | * | 2/1995 | Ingebrethsen .... A61M 15/0085 128/200.16 |
| 5,924,289 | A | * | 7/1999 | Bishop, II ............... F25B 21/04 62/3.61 |
| 6,806,808 | B1 | | 10/2004 | Watters et al. |
| 7,276,675 | B2 | * | 10/2007 | Faries, Jr. ............. A61M 5/445 219/413 |
| 9,495,915 | B1 | * | 11/2016 | Manyam ................. G09G 3/344 |
| 2002/0021741 | A1 | * | 2/2002 | Faries, Jr. ............. G01K 11/12 374/141 |
| 2002/0043978 | A1 | * | 4/2002 | McDonald ........... G01R 31/043 324/508 |
| 2003/0132924 | A1 | | 7/2003 | Hamilton |
| 2004/0156418 | A1 | | 8/2004 | Debord et al. |

(Continued)

FOREIGN PATENT DOCUMENTS

| | | |
|---|---|---|
| CN | 103324965 A | 9/2013 |
| JP | 2007111137 A | 5/2007 |
| SU | 1119093 A1 | 10/1984 |

OTHER PUBLICATIONS

EP search report for EP14198805.5 dated May 8, 2015.
GB search report for GB1422560.1 dated May 29, 2015.

*Primary Examiner* — Sung Il Cho
(74) *Attorney, Agent, or Firm* — O'Shea Getz P.C.

(57) ABSTRACT

A temperature monitor, a temperature monitoring system, and method are provided. The temperature monitor includes an electronic paper display and a passive temperature sensor. The electronic paper display has first and second display states. The passive temperature sensor is coupled to the display such that when the temperature of the sensor attains a predetermined value, the display changes from the first display state to the second display state.

19 Claims, 1 Drawing Sheet

(56) References Cited

U.S. PATENT DOCUMENTS

| | | | | |
|---|---|---|---|---|
| 2005/0122564 A1* | 6/2005 | Zehner | | G06F 3/147 |
| | | | | 359/296 |
| 2005/0134461 A1* | 6/2005 | Gelbman | | G06K 7/10079 |
| | | | | 340/572.8 |
| 2006/0050929 A1* | 3/2006 | Rast | | F41G 3/147 |
| | | | | 382/103 |
| 2006/0055135 A1* | 3/2006 | Tracewell | | B62B 3/006 |
| | | | | 280/47.35 |
| 2006/0121229 A1* | 6/2006 | Nagae | | B41J 3/4075 |
| | | | | 428/40.1 |
| 2006/0191919 A1* | 8/2006 | Cheu | | A47G 19/12 |
| | | | | 219/730 |
| 2006/0209354 A1* | 9/2006 | Saito | | G06F 3/0414 |
| | | | | 358/406 |
| 2006/0227002 A1* | 10/2006 | Jensen | | G09F 3/02 |
| | | | | 340/815.4 |
| 2006/0291533 A1* | 12/2006 | Faries, Jr. | | A61J 1/1462 |
| | | | | 374/162 |
| 2007/0008119 A1* | 1/2007 | Pohle | | G01K 1/024 |
| | | | | 340/539.22 |
| 2007/0060798 A1* | 3/2007 | Krupnik | | A61B 1/00045 |
| | | | | 600/300 |
| 2007/0285229 A1* | 12/2007 | Batra | | G06K 19/0707 |
| | | | | 340/539.26 |
| 2008/0140432 A1* | 6/2008 | Fenn | | G06Q 10/087 |
| | | | | 705/317 |
| 2008/0173719 A1 | 7/2008 | Wang | | |
| 2008/0303637 A1* | 12/2008 | Gelbman | | G06K 7/10079 |
| | | | | 340/10.42 |
| 2009/0020609 A1* | 1/2009 | Cohen | | G06K 7/1095 |
| | | | | 235/462.01 |
| 2009/0045918 A1* | 2/2009 | Droesler | | G06K 7/10059 |
| | | | | 340/10.1 |
| 2009/0103587 A1 | 4/2009 | Cooper et al. | | |
| 2009/0126100 A1* | 5/2009 | Kenoyer | | F24H 1/0081 |
| | | | | 4/559 |
| 2009/0317002 A1* | 12/2009 | Dein | | A61B 19/0256 |
| | | | | 382/224 |
| 2010/0012018 A1* | 1/2010 | Ribi | | C09B 57/10 |
| | | | | 116/207 |
| 2010/0052909 A1* | 3/2010 | Doan | | G06K 19/0716 |
| | | | | 340/572.1 |
| 2010/0156606 A1* | 6/2010 | Gold | | H04Q 9/00 |
| | | | | 340/10.4 |
| 2010/0182518 A1* | 7/2010 | Kirmse | | G06F 1/1626 |
| | | | | 348/836 |
| 2010/0188418 A1* | 7/2010 | Sakai | | G01J 1/4204 |
| | | | | 345/594 |
| 2011/0003039 A1* | 1/2011 | Fox | | A47J 27/10 |
| | | | | 426/88 |
| 2011/0115631 A1* | 5/2011 | Droesler | | G06K 7/10059 |
| | | | | 340/572.7 |
| 2011/0157357 A1* | 6/2011 | Weisensale | | H04N 7/173 |
| | | | | 348/143 |
| 2012/0194322 A1* | 8/2012 | Batra | | G06K 7/0008 |
| | | | | 340/10.33 |
| 2013/0038633 A1* | 2/2013 | Maggiore | | B01D 65/104 |
| | | | | 345/633 |
| 2014/0089243 A1* | 3/2014 | Oppenheimer | | G06F 21/50 |
| | | | | 706/46 |
| 2014/0260111 A1* | 9/2014 | Phillips | | F25D 3/08 |
| | | | | 53/475 |

* cited by examiner

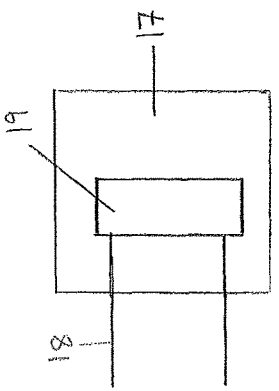
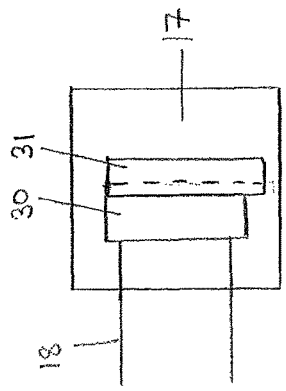
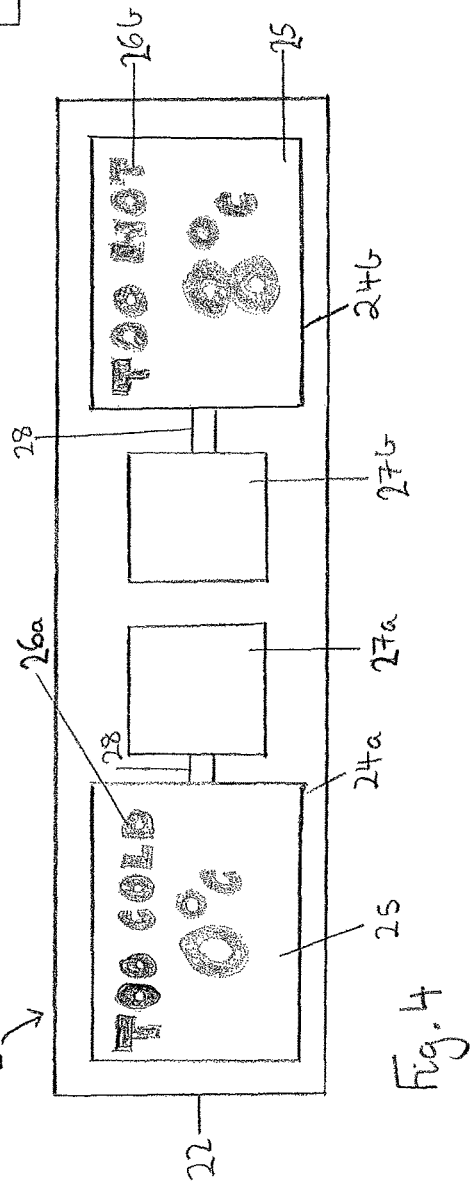

TEMPERATURE MONITOR

This application claims priority to Great Britain Application No. 1322460.5 filed Dec. 18, 2013.

BACKGROUND OF THE INVENTION

1. Technical Field

The present invention relates to a temperature monitor comprising an electronic paper display.

2. Background Information

Electronic paper displays are well known. Also known as e-paper displays and electronic ink displays, electronic paper displays comprise an electronically active ink. Applying a voltage to the ink causes the appearance of the display to be changed.

For example, in an electrophoretic display, colored charged particles (having sizes on the micron scale) are dispersed in a liquid, such as oil. The particles may be white and the liquid may be dark. The liquid is sandwiched between two electrodes. Applying a voltage across the two electrodes creates an electrical field that causes the charged particles to move towards or away from the upper, transparent electrode. The areas of the upper electrode corresponding to where the white particles are positioned will appear lighter than those areas where only the dark oil is visible. In bistable displays, the particles will remain in their positions even after the voltage has been removed. This allows such electronic paper displays to consume very little electricity.

In some electrophoretic displays, light and dark oppositely charged particles are encapsulated in a plurality of microcapsules, which are dispersed in a clear liquid. Applying a voltage across the upper electrode causes the positively charged particles to move, within the microcapsule, towards the negatively charged electrode and the negatively charged particles, within the microcapsule, towards the positively charged electrode. Some displays use three (or more) different color particles, to provide a color display.

Other examples of electronic paper displays use electrowetting or electrofluidic systems.

SUMMARY OF THE INVENTION

The Applicant has recognized that electronic paper displays could be used to provide a permanently changed alert display requiring no conventional power source to activate at the point of a critical temperature being reached, for example for use in drug packaging to ensure product quality where it is vital to know the temperature that has been experienced by a product. For example, an electronic paper display could be incorporated into a sticker or label to be attached to either a package containing heat-sensitive products, such as pharmaceutical products (e.g. live vaccines), that need to be kept within a very limited range of temperatures during transportation and storage prior to use, or even to the products themselves. The electronic paper display could provide a permanent record of whether the product has been subjected to any temperatures outside of this range.

According to the present invention, there is provided a temperature monitor comprising an electronic paper display having first and second display states and a passive temperature sensor electrically coupled to the display such that when the temperature of the sensor attains a predetermined value, the display changes from the first display state to the second display state.

The term "temperature monitor" should be understood to mean any device that can determine and indicate whether a predetermined temperature has been experienced.

The term "electronic paper display" should be understood to refer to any display that uses electronic ink. The display may use any type of electronic ink technology such as electrophoresis, electrowetting or electrofluidics.

The term "display state" refers to any visual representation shown by the display. The first and second display states may be different images, for example different words, numbers and/or symbols, or one of the display states may be blank (i.e. a solid light color) while the other display state is partially or wholly colored (i.e. dark). The electronic paper display may comprise two different colors (i.e. may be monochrome) or more than two different colors.

The term "passive temperature sensor" should be understood to refer any sensor that is capable of providing a response to a temperature without requiring any additional source of energy (such as a power source). As such, the temperature sensor does not need to be connected to a battery or any other source of electrical energy.

The predetermined value can be any temperature set-point and will be determined on the particular use of the temperature monitor. For example, if the temperature of live vaccines is being monitored, the predetermined value may be a lower limit, such as zero degrees centigrade (0° C.) or slightly above 0° C., such as 1° C. Alternatively, the predetermined value may be an upper limit, such as 5° C.

The temperature monitor of the present invention provides a convenient way of monitoring whether a product has been exposed to an undesirable temperature, for example during shipping when the product may not be easily accessible. Preferably, the temperature monitor is cheap to manufacture and easy to install on a product at item level, rather than pallet or case level, to be monitored. For example, each box of products in a pallet (or container) and each item in a case on the pallet can have an individual monitor associated therewith, instead of only using a single monitor per pallet. This provides a more accurate indication of the temperatures experienced by each product positioned anywhere in the pallet.

As discussed above, the predetermined value may be attained via a decrease in temperature or an increase in temperature. For example, products may be shipped in a refrigerated container, which is intended to hold the products at a temperature of about 5° C. The predetermined value may be set at 0° C. or alternatively at 8° C., as discussed above.

Preferably, the display is bistable, meaning that the display has two display states that are each stable for a considerable length of time (e.g. a few days, weeks months or even years) after the voltage has been removed.

Preferably, the temperature monitor is passive. This means that the temperature monitor (as well as the sensor) carries no source of energy, such as a battery. Instead, the passive temperature monitor uses an external temperature as a source of energy. This provides a smaller, lighter and cheaper temperature monitor.

The temperature sensor may comprise a device that acts as a transducer, i.e. the device is configured to convert energy from one form into another.

In one embodiment, the temperature sensor may comprise a device that directly produces a potential difference when the predetermined value is attained. In other words, when the predetermined temperature is attained, the device may itself produce a potential difference that activates the electronic paper display to change between first and second display states. For example, the temperature sensor or device may be a thermocouple.

In an alternative embodiment, the temperature sensor may comprise a device that indirectly produces a potential difference when the predetermined value is attained. In other words, when the predetermined temperature is attained, the device may provide a response, which in turn, causes an action that produces a potential difference that activates the electronic paper display to change between first and second display states. For example, the sensor may comprise a piezoelectric element and the device may be arranged to impart a mechanical force on the piezoelectric element when the predetermined value is attained. For example, the device may be a temperature sensitive mechanical device, such as a bimetallic element. When the predetermined temperature is attained, the bimetallic element may operate such that it imparts a force on the piezoelectric element, which in turn will produce a potential difference that activates the electronic paper display to change to the second display state. The bimetallic element may be a creep type actuator, producing cumulative movement over a range of temperatures, or a snap acting actuator which is configured to produce a "snap" movement at a predetermined temperature. The latter type of actuator is commonly used in thermally sensitive switches.

In use, the bimetallic element may be positioned inside a package (containing products to be monitored), with the display being positioned on outer surface of the package. The package (such a cardboard box or carton) may comprise a separate internal compartment (i.e. separate from the product-receiving compartment(s)) for receiving the bimetallic element so that the bimetallic element has room to move freely as the temperature changes. Conductive tracks or wires may run between the display and the bimetallic element, for example, via a gap in the package outer surface, such as a gap between the flaps of the package. The display and bimetallic element may be provided on separate labels or stickers.

Preferably, the temperature monitor is arranged such that the electronic paper display remains in the second display state regardless of any subsequent changes in the temperature of the sensor. The display may have features such that any transition from the first display state to the second display state is irreversible, at least for the normal operating life on the temperature monitor. This may be in the region of days, weeks, months or years. In other words, if the temperature reverts to the normal range (i.e. drops back below or rises back above the predetermined value), the display will remain in the second display state (rather than reverting to the first display state). This provides a reliable, long term record of whether the predetermined value has been attained.

The electronic paper display may be relatively small. For example, the display may be square or rectangular and have a largest dimension (i.e. length) of 6 cm or less, 5 cm or less, 4 cm or less or 3 cm or less.

The present invention extends to a temperature monitoring system comprising two temperature monitors. The two temperature monitors may each comprise any of the features described above. Preferably, the two monitors operate in the same manner, except that the first temperature monitor has a lower predetermined value than the second temperature monitor. The temperature monitoring system can provide an indication of whether two different predetermined values have been attained, i.e. whether the temperatures have remained within a desired range.

Preferably, the second display state of the first temperature monitor is different to that of the second temperature monitor, so that it is clearly visible which temperature monitor refers to which predetermined value (i.e. which end value of the desired range). For example, the second display state of the first temperature monitor may show "TOO COLD" and/or "0° C." and the second display state of the second temperature monitor may show "TOO HOT" and/or "8° C."

Alternatively, the second display states of the first and second temperature monitors may be the same and the temperature monitors may comprise some other indicators of the first and second predetermined values, such as markings adjacent the two electronic paper displays, or a timer device if the cost of goods is sufficient to justify the additional cost The predetermined values of the first and second temperature monitors will depend on the products being stored and/or transported. In the above-mentioned situation, where live vaccines are being transported, the predetermined value of the first temperature monitor may be between −1 and 2° C., between 0 and 1° C. or 0° C. and the predetermined value of the second temperature monitor may be 5° C., between 5 and 10° C., between 7 and 9° C. or 8° C.

The temperature monitor or monitoring system may further comprise means for securing the temperature monitor or monitoring system to a product or to a set of products (such as a box of products); e.g., a temperature monitor or monitoring system may be configured to be secured to a product or a set of products.

In one embodiment, the securing means may comprise adhesive. For example, the temperature monitor or monitoring system may be incorporated into an adhesive sticker or label for attachment to a product or set of products. Where there are two or more temperature monitors, the monitors may be incorporated into a single (common) label or sticker or individually onto two or more labels or stickers. The present disclosure is not limited to this embodiment, however; e.g., the temperature monitor or monitoring system may be attached to a product or product packaging by tape, mechanical fastener, etc.

The present invention therefore also extends to a sticker or label comprising a temperature monitor or monitoring system as described above. The sticker or label may be rectangular and have a largest dimension (i.e. length) of 10 cm or less, 8 cm or less or 6 cm or less. As discussed above, the display or displays on the sticker or label may be square or rectangular and have a length of 6 cm or less, 5 cm or less, 4 cm or less or 3 cm or less.

Alternatively, if the packaging substrate is suitable, parts of the temperature monitor may be printed directly onto the package itself and the component features required to activate the display may be added during the package production process, such as the carton gluing process.

The present invention also extends to a method of determining whether a product has been exposed to a temperature outside of a desired range, the method comprising securing a temperature monitor or monitoring system as described above to a product (or set of products) and visually inspecting the display state of the electronic paper display or displays.

The present invention also extends to a package comprising a temperature monitor as described above (in any aspect or embodiment thereof), wherein the temperature monitor is secured to a surface of the package.

The package may, for example, be a carton or a box, which may be made of cardboard.

The package may comprise a separate internal compartment configured to receive the passive temperature sensor. The compartment may be separate from any product receiving compartments of the package.

Conductive tracks or wires may extend from the display, secured to an outer surface of the package, to the passive temperature sensor via a gap in the outer surface of the package. The gap may be formed between two or more folded flaps of the package.

The passive temperature sensor and display may be positioned on separate stickers or labels, or alternatively a single sticker/label may extend from the outer surface of the package to the inner surface and/or the internal compartment.

BRIEF DESCRIPTION OF THE DRAWINGS

Some preferred embodiments of the present invention will now be described by way of example only and with reference to FIGS. 1 to 4 of which:

FIG. 1 is a schematic plan view of a temperature monitor in accordance with one embodiment of the present invention;

FIG. 2 is a schematic plan view of part of the temperature monitor of FIG. 1 including a temperature sensor according to an embodiment of the present invention;

FIG. 3 is a schematic plan view of part of the temperature monitor of FIG. 1 including a temperature sensor according to another embodiment of the present invention; and FIG. 4 is a schematic plan view of a temperature monitor in accordance with another embodiment of the present invention.

DETAILED DESCRIPTION

FIG. 1 shows a temperature monitor 10 comprising a sticker (or label) 12. One corner 12a of the sticker 12 is upturned to show the lower surface comprising an adhesive layer 13 for securing the temperature monitor 10 to a product to be monitored.

The monitor 10 also comprises an electronic paper display 14 (e.g. an electrophoretic ink display) which is connected to a passive temperature sensor 17 via a pair of conductors 18. The display 14 is shown in a second display state having a message "TOO COLD 0° C." 16 in a darker color than the light background 15. The first display state (not shown) may comprise a blank screen (i.e. only having the light background 15) or a different image such as "OK".

Dotted lines 17a are used, for illustration purposes only, to outline the portion of the monitor 10 shown in FIGS. 2 and 3.

FIG. 2 shows the portion of the monitor 10 of FIG. 1 comprising passive temperature sensor 17 and pair of conductors 18. In this embodiment, the sensor 17 comprises a thermocouple 19 that provides a potential difference to the display 14 when a predetermined temperature (such as 0° C.) is experienced. The display 14 may contain an upper transparent electrode, a lower electrode, a layer of electronic ink between the electrodes and an associated electronic circuit (all not shown), as is known in the art. As would be clear to a person skilled in the art, applying a potential difference to the display 14 can activate the display 14 to change from a first display state (not shown) to the second display state.

FIG. 3 shows an alternative embodiment, where the passive temperature sensor 17 comprises a bimetallic element or strip 31 and a piezoelectric element 30 electrically connected to the pair of conductors 18. The sensor 17 is arranged such that when the bimetallic strip 31 is exposed to the predetermined temperature (such as 0° C.), it will deform towards the piezoelectric element 30 and impart a force thereto. This force causes the piezoelectric element 30 to generate a potential difference across the display 15. This, in turn activates the display 14 to change to the second display state.

The bimetallic element or strip 31 may be far more elongated than shown in FIG. 3, so that its free end is substantially spaced from the piezoelectric element 30.

As discussed above, the sensor 17 may be positioned within a package (not shown), while the display 14 may be secured to an outer surface of the package. The display 14 and sensor 17 may be positioned on the same or on two separate labels/stickers 12.

FIG. 4 shows an alternative embodiment where the temperature monitor 20 comprises a sticker 22 having two electronic paper displays 24a, 24b, each connected to a temperature sensor 27a, 27b via conductors 28. The displays 24a, 24b have different second display states so that the first display 24a can indicate when a "TOO COLD 0° C." temperature has been experienced, while the second display 24b can indicate when a "TOO HOT 8° C." temperature has been experienced. The temperature sensors 27a, 27b can use either of the sensors shown in FIGS. 2 and 3 and are configured to produce a potential difference at different predetermined temperatures (0° C. and 8° C. respectively in this example).

What is claimed is:

1. A passive temperature monitor comprising:
   an electronic paper display comprising an electronically active ink, the electronic paper display configured to have a first visual display state and a second visual display state, wherein the electronic paper display is configured to utilize the electronically active ink in at least one of the first visual display state or the second visual display state to produce visual information; and
   a passive temperature sensor electrically coupled to the electronic paper display, the passive temperature sensor configured such that when the temperature of the passive temperature sensor attains a predetermined value, the passive temperature sensor directly or indirectly produces a response that is communicated to, or sensible by, the electronic paper display, wherein the response is produced without an energy input other than ambient temperature; and
   wherein the electronic paper display is configured to change from the first visual display state to the second visual display state upon receiving the communicated response, or sensing the response, from the passive temperature sensor.

2. The temperature monitor of claim 1, wherein the predetermined value is attained via a decrease in temperature or an increase in temperature.

3. The temperature monitor of claim 1, wherein the electronic paper display is bistable.

4. The temperature monitor of claim 1, wherein the passive temperature sensor comprises a device that indirectly produces a potential difference when the predetermined value is attained, wherein the potential difference is the response communicated to, or is sensible by, the electronic paper display.

5. The temperature monitor of claim 4, wherein the passive temperature sensor comprises a piezoelectric element and the device is arranged to impart a force on the piezoelectric element when the predetermined value is attained.

6. The temperature monitor of claim 5, wherein the device is a temperature sensitive mechanical device.

7. The temperature monitor of claim 6, wherein the temperature sensitive mechanical device is a bimetallic switch or a bimetallic strip.

8. The temperature monitor of claim 1, wherein the passive temperature sensor comprises a device that directly produces a potential difference when the predetermined value is attained, wherein the potential difference is the response communicated to, or is sensible by, the electronic paper display.

9. The temperature monitor of claim 8, wherein the device is a thermocouple.

10. The temperature monitor of claim 8, wherein the passive temperature sensor is a thermocouple.

11. The temperature monitor of claim 1, wherein the electronic paper display is configured to remain in the second display state regardless of any subsequent changes in the temperature of the passive temperature sensor.

12. A passive temperature monitoring system, comprising:
a first temperature monitor that includes a first electronic paper display comprising an electronically active ink, the first electronic paper display configured to have a first visual display state and a second visual display state, wherein the first electronic paper display is configured to utilize the electronically active ink in at least one of the first visual display state or the second visual display state to produce visual information, and a first passive temperature sensor electrically coupled to the first electronic paper display, the first passive temperature sensor configured such that when the temperature of the first passive temperature sensor attains a first predetermined value, the first passive temperature sensor directly or indirectly produces a first response that is communicated to, or is sensible by, the first electronic paper display, wherein the first response is produced without an energy input other than ambient temperature, and wherein the first electronic paper display is configured to change from the first visual display state to the second visual display state upon receiving the communicated first response, or sensing the first response, from the first passive temperature sensor; and
a second temperature monitor that includes a second electronic paper display comprising an electronically active ink, the second electronic paper display configured to have a first visual display state and a second visual display state, wherein the second electronic paper display is configured to utilize the electronically active ink in at least one of the first visual display state or the second visual display state to produce visual information, and a second passive temperature sensor electrically coupled to the second electronic paper display, the second passive temperature sensor configured such that when the temperature of the second passive temperature sensor attains a second predetermined value, the second passive temperature sensor directly or indirectly produces a second response that is communicated to, or is sensible by, the second electronic paper display, wherein the second response is produced without an energy input other than ambient temperature, and wherein the second electronic paper display is configured to change from the first visual display state to the second visual display state upon receiving the communicated second response, or sensing the second response, from the second passive temperature sensor;
wherein the first predetermined value is lower than the second predetermined value.

13. The temperature monitoring system of claim 12, wherein the second visual display state of the first temperature monitor is different than the second visual display state of the second temperature monitor.

14. The temperature monitoring system of claim 12, wherein the first predetermined value of the first temperature monitor is in a range from about −1° C. to 1° C.

15. The temperature monitoring system of claim 12, wherein the second predetermined value of the second temperature monitor is in a range from about 5° C. to 10° C.

16. The temperature monitoring system of claim 12, wherein the system is configured to be secured to a product or a set of products.

17. The temperature monitoring system of claim 16, wherein the configuration includes an adhesive.

18. A package comprising:
a structure sized to contain one or more temperature sensitive devices, which structure includes at least one surface; and
a passive temperature monitor that includes:
an electronic paper display comprising an electronically active ink, the electronic paper display configured to have a first visual display state and a second visual display state, wherein the electronic paper display is configured to utilize the electronically active ink in at least one of the first visual display state or the second visual display state to produce visual information; and
a passive temperature sensor electrically coupled to the electronic paper display, the passive temperature sensor configured such that when the temperature of the passive temperature sensor attains a predetermined value, the passive temperature sensor directly or indirectly produces a response that is communicated to, or sensible by, the electronic paper display, wherein the response is produced without an energy input other than ambient temperature; and
wherein the electronic paper display is configured to change from the first visual display state to the second visual display state upon receiving the communicated response, or sensing the response, from the passive temperature sensor;
wherein the temperature monitor is secured to the surface of the structure.

19. A method of determining whether a product has been exposed to a temperature outside of a desired range, the method comprising:
securing to a product or product packaging at least one passive temperature monitor that includes:
an electronic paper display comprising an electronically active ink, the electronic paper display configured to have a first visual display state and a second visual display state, wherein the electronic paper display is configured to utilize the electronically active ink in at least one of the first visual display state or the second visual display state to produce visual information; and
a passive temperature sensor electrically coupled to the electronic paper display, the passive temperature sensor configured such that when the temperature of the passive temperature sensor attains a predetermined value, the passive temperature sensor directly or indirectly produces a response that is communicated to, or is sensible by, the electronic paper display, wherein the response is produced without an energy input other than ambient temperature; and wherein the electronic paper display is configured to change from the first visual display state to the second visual display state upon receiving the communicated response, or sensing the response, from the passive temperature sensor; and visually inspecting the display state of the electronic paper display(s).

* * * * *